United States Patent [19]

Topham

[11] 4,224,212

[45] Sep. 23, 1980

[54] DISPERSING AGENTS, DISPERSIONS CONTAINING THESE AGENTS AND PAINTS AND INKS MADE FROM THE DISPERSIONS

[75] Inventor: Arthur Topham, Blackley, England

[73] Assignee: Imperial Chemical Industries Limited, London, England

[21] Appl. No.: 919,831

[22] Filed: Jun. 28, 1978

[30] Foreign Application Priority Data

Jul. 15, 1977 [GB] United Kingdom ............... 29803/77

[51] Int. Cl.$^2$ ...................... B01F 17/52; C08K 5/01; C08K 5/02

[52] U.S. Cl. ................................ 260/33.6 R; 106/20; 106/22; 106/308 N; 260/18 R; 260/31.2 N; 260/32.8 N; 260/33.8 R; 260/34.2; 525/417; 525/437; 528/332; 528/361

[58] Field of Search ................. 260/34.2, 823, 33.6 R, 260/33.8, DIG. 38; 528/333, 361, 332; 106/308 N, 308 Q; 525/417, 437

[56] References Cited

U.S. PATENT DOCUMENTS

| | | | |
|---|---|---|---|
| 3,778,287 | 12/1973 | Stansfield et al. | 106/308 Q |
| 3,882,088 | 5/1975 | Thompson | 260/823 |
| 3,923,723 | 12/1975 | Klein | 260/34.2 |
| 3,996,059 | 12/1976 | Stansfield et al. | 106/308 N |
| 4,057,436 | 11/1977 | Davies et al. | 106/308 N |

FOREIGN PATENT DOCUMENTS 1543762  9/1968  France .

*Primary Examiner*—Allan Lieberman
*Attorney, Agent, or Firm*—Cushman, Darby & Cushman

[57] ABSTRACT

Dispersing agents comprising a poly(lower alkylene)imine chain to which are attached at least two polyester chains by means of salt and/or amide links and the use of these agents in the preparation of dispersions of solids, particularly dyestuffs and pigments, in organic liquids.

16 Claims, No Drawings

DISPERSING AGENTS, DISPERSIONS CONTAINING THESE AGENTS AND PAINTS AND INKS MADE FROM THE DISPERSIONS

This invention relates to dispersing agents and to dispersions of a solid in organic liquids containing such dispersing agents.

According to the present invention we provide a dispersing agent comprising the reaction product of a poly(lower alkylene)imine with a polyester having a free carboxylic acid group, in which there are at least two polyester chains attached to each poly(lower alkylene)imine chain.

The reaction product is a salt or an amide depending on the severity of the reaction conditions under which the polyester is reacted with the poly(lower alkylene)imine.

A preferred polyester is derived from a hydroxycarboxylic acid of the formula HO—X—COOH wherein X is a divalent saturated or unsaturated aliphatic radical containing at least 8 carbon atoms and in which there are at least 4 carbon atoms between the hydroxy and carboxylic acid groups, or from a mixture of such a hydroxycarboxylic acid and a carboxylic acid which is free from hydroxy groups.

The salt and/or amide may be partially neutralised with an acid, especially a mineral acid and it may be alkylated, the alkyl group added being optionally substituted, by reaction with for example dimethyl sulphate whereupon a salt is also formed.

The term lower alkylene refers to an alkylene group containing from 2 to 4 carbon atoms and the preferred poly(lower alkylene)imine is polyethylene imine which is available either in a substantially linear form or in a branched form. It is preferred to use a branched form of the polyethylene imine and more especially a highly branched form in which at least 20% of the nitrogen atoms are present in tertiary amino groups. The molecular weight of suitable poly(lower alkylene)imines is generally greater than 500, preferably greater than 5000, more especially in the range from 10,000 to 100,000. Stated another way, the poly(lower alkylene)imine may have from 7 to 2326 monomer units. In the examples given hereinafter, the polyethyleneimines have molecular weights corresponding to the following viscosities in centipoise measured at 25° C. as a 25% solution in water:
DOW PEI: 9.3
DOW PEI 600: 2580.0
BASF Polymin P: 2780.0.

The preferred polyester can for example be obtained by heating the hydroxycarboxylic acid or a mixture of such acids or a mixture of the hydroxycarboxylic acid and a carboxylic acid, optionally in the presence of an esterification catalyst, preferably at a temperature in the region of 160° to 200° C., until the required molecular weight has been obtained. The course of the esterification can be followed by measuring the acid value of the product, the preferred polyester having an acid value in the range of 10 to 100 mgms KOH/gm and especially in the range of 20 to 50 mgms KOH/gm. The indicated acid value range of 10 to 100 mgms KOH/gm is equivalent to a number average molecular weight range of 5600 to 560. The water formed in the esterification reaction is removed from the reaction medium, and this can be conveniently done by passing a stream of nitrogen over the reaction mixture or, preferably, by carrying out the reaction in the presence of a solvent, such as toluene or xylene, and distilling off the water as it is formed.

The resulting polyester can then be isolated in conventional manner; however, when the reaction is carried out in the presence of an organic solvent whose presence would not be harmful in the subsequent dispersion, the resulting solution of the polyester can be used.

In the said hydroxycarboxylic acids the radical represented by X preferably contains from 12 to 20 carbon atoms, and it is further preferred that there are between 8 and 14 carbon atoms between the carboxylic acid and hydroxy groups. It is also preferred that the hydroxy group is a secondary hydroxy group.

As specific examples of such hydroxycarboxylic acids there may be mentioned ricinoleic acid, a mixture of 9- and 10-hydroxystearic acids (obtained by sulphation of oleic acid followed by hydrolysis), and 12-hydroxystearic acid, and especially the commercially available hydrogenated castor oil fatty acid which contains in addition to 12-hydroxystearic acid minor amounts of stearic acid and palmitic acid.

The carboxylic acids which can be used in conjunction with the hydroxycarboxylic acids to obtain the preferred polyesters are preferably carboxylic acids of saturated or unsaturated aliphatic compounds, particularly alkyl and alkenyl carboxylic acids containing a chain of from 8 to 20 carbon atoms. As examples of such acids there may be mentioned lauric acid, palmitic acid, stearic acid and oleic acid.

An especially preferred polyester is one derived from commercial 12-hydroxy-stearic acid having a number average molecular weight of about 1600. Polyesters such as this are described in greater detail in U.K. Patent Specification Nos. 1373660 and 1342746.

The weight ratio of polyester to polyalkylene imine in the dispersing agent is desirably greater than 1 and preferably in the range from 1 to 10. It is especially preferred in the case of a dispersing agent formed by reacting polyethylene imine and a polyester derived from 12-hydroxy stearic acid that the weight ratio of the polyester to the polyethylene imine is in the range from 2 to 5. The equivalent molar ratios of the two reactants depends, of course, on their respective average molecular weights.

According to a further feature of the invention we provide a dispersion of a solid in an organic liquid containing a dispersing agent as hereinbefore defined.

The said dispersion can be obtained by any of the conventional and well known methods of preparing dispersions. Thus the solid, the organic liquid and the dispersing agent may be mixed in any order and the mixture then subjected to a mechanical treatment to reduce the particle size of the solid, for example by ball milling, bead milling, gravel milling or plastic milling until the dispersion is formed.

Alternatively, the solid can be treated to reduce its particle size independently or in admixture with either the organic liquid or the dispersing agent, and the other ingredient or ingredients then added following which dispersion can be obtained by stirring the mixture. A dispersion obtained in this way and comprising the solid in finely divided form and one or more dispersing agents is a further feature of the invention.

It is preferred that the amount of dispersing agent present in the dispersion is such as corresponds to from 5% to 50% by weight, and more preferably from 15 to 40%, based on the weight of the solid, and the dispersion preferably contains from 20% to 50% by weight of the solid based on the total weight of the dispersion.

The solid may be any inorganic or organic compound which is substantially insoluble in the organic liquid at the temperature concerned and which is capable of comminution into a finely divided form. The invention is of particular value when the solid is a pigment or a dyestuff, and dispersions containing such solids are a preferred feature of the invention. The term pigment includes both inorganic and organic pigments and also lakes and toners.

As examples of organic pigments there may be mentioned azo, thionindigo, anthraquinone, anthanthrone and isodibenzanthrone pigments, vat dye pigments, triphendioxazine pigments, phthalocyanine pigments for example copper phthalocyanine, its nuclear chlorinated derivatives and cooper tetraphenyl or octaphenyl phthalocyanine and other heterocyclic pigments, for example linear quinacridone.

As examples of inorganic pigments there may be mentioned chrome pigments including the chromates of lead, zinc, barium and calcium and various mixtures and modifications such as are commercially available as pigments of greenish-yellow to red shades under the names primrose, lemon, middle orange, scarlet and red chromes. Modified chrome pigments may contain for example sulphate radicals and/or additonal metals such as aluminium, molybdenum and tin. Further examples of inorganic pigments are carbon black, titanium dioxide, zinc oxide, Prussian blue and its mixtures with chrome yellows which are known as Brunswick Greens or chrome greens, cadmium sulphide and sulphoselenide, iron oxides, vermilion and ultramarine. These and various other pigments suitable for use in the present invention are described in Volume 2 of "Colour Index 2nd Edition," published jointly in 1956 by the Society of Dyers and Colourists and the American Association of Textile Chemists and Colourists, under the heading of "Pigments" and in subsequent authorised amendments thereto.

The term "lake" denotes a water-insoluble metal salt or complex of an organic dyestuff which has been precipitated on a water-insoluble inorganic substrate such as alumina.

The term "toner" denotes a water-insoluble metal salt or complex, in particular a calcium or barium salt or complex, of a soluble or sparingly soluble organic dyestuff, in particular an azo dyestuff, which has optionally been prepared in the presence of an extender such as rosin.

As specific examples of the said lakes and toners there may be mentioned the barium toner of 1-(2'-sulpho-4'-methyl-5'-chlorophenylazo)-2-hydroxy-3-naphthoic acid, the nickel complex of 3-(4'-chlorophenylazo)-quinoline-2:4-diol, the rosinated barium toner of 1-(2'-sulpho-4'-chloro-5'-methylphenylazo)-2-naphthol, the aluminium lake of 1:4-dihydroxyanthraquinone-2-sulphonic acid and, above all, a rosinated calcium toner of 1-(2'-sulpho-4'-methylphenylazo)-2-hydroxy-3-naphthoic acid.

Especially preferred pigments for use in the present dispersion are rubine toners, benzidine yellows and carbon blacks such as are used in publication gravure printing and newsprint ink.

As examples of dyestuffs there may be mentioned water-insoluble dyestuffs such as disperse dyestuffs and water-soluble dyestuffs such as basic, acid and direct dyestuffs. The dyestuffs may be for example azo dyestuffs, such as monoazo and disazo dyestuffs and metallised derivatives thereof, anthraquinone, nitro, phthalocyanine, methine, styryl, naphthoperinone, quinophthalone, diarylmethane, triarylmethane, xanthine, azine, oxazine and thiazine dyestuffs. If desired the dyestuffs can be reactive dyestuffs which contain groups capable of forming covalent bonds with textile materials.

Any organic liquid may be used in the dispersion but hydrocarbons are preferred. As examples of such liquids there are mentioned aromatic hydrocarbons such as benzene, toluene, xylene, aliphatic and cycloaliphatic hydrocarbons such as petroleum fractions, white spirit and cyclohexane, and high boiling mineral oils such as spindle oil. Alternative organic liquids are halogen substituted hydrocarbons such as chlorobenzene, trichloroethylene, perchloroethylene, 1,1,1-trichloroethane, methylene dichloride, chloroform, 1,1,2-trichloro-1,2,2-trifluoroethane, carbon tetrachloride, tetrachloroethane or dibromoethylene and mixtures of these compounds, esters such butyl acetate and heat bodied linseed oils used as lithographic varnish media and ketones such as methylethylketone methylisobutyl ketone and cyclohexanone. Mixtures of such solvents may be used. The solvents may contain other materials in solution, for example the alkyd, nitrocellulose, acrylic, urea/formaldehyde, melamine/formaldehyde or other resins used in paint media or zinc/calcium rosinates used in gravure ink media. Especially preferred solvents are a petroleum fraction with a boiling point in the range 100°–120° C., toluene, xylene and spindle oil.

The dispersions of the invention are fluid or semi-fluid compositions containing the solid in finely divided and usually deflocculated form, and can be used for any purpose for which dispersions of these particular solids are conventionally used. Thus the pigment dispersions are of value in the manufacture of printing inks particularly publication gravure and newsprint inks by incorporating the dispersions with the other components conventionally used in the manufacture of such inks. These dispersions are also of value in the manufacture of paints, for which purpose the dispersions are incorporated into conventional alkyd or other resins.

The dyestuff dispersions are useful in the preparation of textile printing inks or solvent dyeing systems and particularly where the dyestuff is a sublimable disperse dyestuff, transfer printing. Inks and paints containing such dispersions are further features of the present invention.

Where the dispersions are semi-fluid, their fluidity may be enhanced by the addition of fluidising agents such as are described in U.K. Specification No. 1508576.

The invention is further illustrated by the following Examples in which the parts and percentages are by weight.

Agent A

A mixture of 50 parts of polyethylenimine having a molecular weight of about 1200 (sold under the trade name PEI 12 by Dow Chemical Company) and 66.6 parts of Polyester A (see below) is stirred for 3 hours at 150° C. under a current of nitrogen, allowing water vapour to escape. The acid value is then 5.4 mg KOH/g. The product is a gum, soluble in toluene, insoluble in water. The infra-red spectrum shows bands at 3300, 1660 and 1550 cm$^{-1}$ due to amide groups, at 1610 and 780 cm$^{-1}$ due to amino groups and at 1735 cm$^{-1}$ due to ester groups. This product is essentially a 1:1 molar reaction product of the polyethylene imine and a polyester and therefore of the general type disclosed in U.S. Pat. No. 3,882,088. It is not an example of the present invention and is included only for the purpose of comparison.

Polyester A

A mixture of 348 parts of xylene and 3350 parts of a commercial grade of 12-hydroxystearic acid (having acid and hydroxyl values of 182 mg KOH/gm and 160 mg KOH/gm respectively) is stirred for 22 hours at 190° C. to 200° C., the water formed in the reaction being separated from the xylene in the distillate which is then returned to the reaction medium. After 152 parts of water have been collected, the xylene is removed by heating at 200° C. in a stream of nitrogen. The resulting pale amber coloured liquid has an acid value of 35.0 mgms KOH/gm.

EXAMPLE 1

Agent B

This is prepared similarly to Agent A but using double the quantity of Polyester A and heating for only 2 hours. Acid value 5.2 mg KOH/g. The infra-red spectrum is similar to that of Agent A but the bands due to amino groups are weaker.

EXAMPLE 2

Agent C

A mixture of 75 parts of highly-branched polyethyleneimine having a molecular weight of about 50,000 (sold under the trade name PEI 600 as a 33% aqueous solution by Dow Chemical Company) and 21.6 parts of toluene is stirred and boiled under nitrogen using a separator to remove water from the distillate whilst returning toluene to the reaction mixture. 50 Parts of Polyester A and a further 21.6 parts of toluene is added and the mixture stirred allowing toluene to distil off until the temperature reached 150° C. After 1 hour at 150° C. the mixture becomes too viscous to stir, but the mixture is kept at 150° C. for a further 2 hours. On cooling it forms a brown rubber soluble in hydrocarbon solvents. The acid value is 16.8 mg KOH/g.

EXAMPLE 3

Agent D

A solution of 22 parts of Agent B in 33 parts of toluene at 38° C. is stirred whilst 1.35 parts of dimethyl sulphate is added. There is an exothermic reaction which raises the temperature to 48° C. After stirring at 90° to 100° C. for 45 minutes to complete the reaction it is cooled, giving a clear 41.4% solution.

EXAMPLE 4

Agent E

50 Parts of an approximately 50% aqueous solution of a polyethylenimine having a molecular weight in the region of 50,000 (sold under the trade name Polymin P by BASF) is evaporated at 100° C. under reduced pressure, finally at 18 mm of mercury, then to the 24.1 parts of residue 192.8 parts of Polyester A is added. The mixture is stirred under a current of nitrogen for 2 hours at 150° C. On cooling it forms a soft rubber, soluble in hydrocarbon solvents. A solution of 22 parts of this product in 44 parts of toluene is stirred whilst 0.45 part of dimethyl sulphate is added. After stirring for 45 minutes at 90°–100° C. to complete the reaction it is cooled, giving a clear 33.7% solution.

EXAMPLE 5

Agent F

100 Parts of Polymin P is evaporated at 100° C. under reduced pressure, finally at 18 mm of mercury, then 190.8 parts of Polyester A is added. The mixture is heated under a current of nitrogen for 2 hours at 150° C. On cooling it forms a rubber, soluble in hydrocarbon solvents. A solution of 22 parts of this product in 44 parts of toluene is stirred whilst a solution of 0.81 part of sulphuric acid in 5 parts of water is added. The water is distilled out using a separator to return the toluene to the reaction mixture, giving a clear 33.6% solution.

EXAMPLE 6

Agent G

This is prepared similarly to Agent F but using instead of the sulphuric acid 1.18 parts of concentrated hydrochloric acid. The final solution is a clear 32.9% solution.

EXAMPLE 7

Agent H

A mixture of 250 parts of Polyester A, 275 parts of a petroleum fraction boiling at 100° to 120° C. and 125 parts of Polymin P is stirred whilst the water is distilled out using a separator to return the petroleum fraction to the reaction mixture. The product is a clear 55.6% solution. It is a salt as shown by the presence of a band at 1565 cm$^{-1}$ due to carboxylate anion groups and the absence of bands due to amide groups in the infra-red spectrum.

EXAMPLE 8

Agent I

A mixture of 1200 parts of ricinoleic acid and 156 parts of xylene is boiled for 23 hours at 190° to 200° C. using a separator to remove water from the distillate and return xylene to the reaction mixture. The solvent is then removed at 150° C. under reduced pressure leaving polyricinoleic acid as an oil of acid value 23.9 mg KOH/g.

100 Parts of Polymin P is evaporated at 100° C. under reduced pressure, finally at 18 mm of mercury, then 193.6 parts of the polyricinoleic acid is added. After stirring for 15 minutes at 40° C. the salt is obtained as a clear viscous liquid.

EXAMPLE 9

Agent J

A mixture of 200 parts of Polyester A, 100 parts of Polymin P and 250 parts of spindle oil is stirred whilst the temperature is gradually raised to 110° C., allowing water vapour to escape, and adding a small quantity of a silicone anti-foaming agent as required to prevent foaming. After 20 minutes at 110° C. the 50% solution of the product, predominantly the salt, is cooled to 20° C. forming a viscous solution. The infra-red spectrum shows a weak amide band at 1660 cm$^{-1}$ and strong bands at 1565 cm$^{-1}$ due to carboxylate anion and at 1730 cm$^{-1}$ due to ester groups.

EXAMPLE 10

Agent K

A mixture of 160 parts of Polyester A, 80 parts of Polymin P, 200 parts of spindle oil (a high-boiling mineral oil fraction used in news inks) and 0.05 part of a 50% emulsion of a silicone anti-foaming agent is stirred under a current of nitrogen whilst the temperature is raised to 150° C. allowing water vapour to escape. After 80 minutes at 150° C. it is cooled to 110° C. and a further 262 parts of spindle oil added. After stirring at 100°–110° C. for one hour the 30% solution is cooled, forming a viscous solution. The infra-red spectrum shows the presence of more amide groups than in Agent J.

EXAMPLE 11

A mixture of 4 parts of 1-amino-2-phenoxy-4-hydroxyanthraquinone, 1.2 parts of Agent B and 4.8 parts of a petroleum fraction boiling at 100° to 120° C. is ball milled for 16 hours to give a fluid dispersion of the dyestuff which is suitable for use in the dyeing of polyester fibres from organic solvents, and for use in gravure and rotary screen printing inks particularly for printing paper to give transfer papers suitable for application to polyester textile materials by the transfer printing process.

EXAMPLE 12

A mixture of 3 parts of polychloro copper phthalocyanine, 0.9 part of Agent B and 6.1 parts of a petroleum fraction boiling at 100° to 120° C. is ball milled for 16 hours to give a fluid dispersion of the pigment which is suitable for use in a gravure printing ink.

Similar dispersions are obtained when the above pigment is replaced by any of the following:
(a) flavanthrone
(b) 4,10-dibromoanthanthrone
(c) indanthrone
(d) lead sulphochromate
(e) the phosphomolybdotungstate of C.I. Basic Blue 7 (42595).

EXAMPLE 13

A mixture of 3 parts of C.I. Pigment Green No. 10 (12775), 1.62 parts of the 55% solution of Agent H and 5.38 parts of a petroleum fraction boiling at 100° to 120° C. is ball milled for 16 hours to give a fluid dispersion of the pigment.

Similar dispersions are obtained when the above pigment is replaced by C.I. Pigment Red No. 3 (12120) or by C.I. Pigment Red No. 57 (15850 Lake).

If Agent H is replaced by a compound of the type described in French Patent Specification No. 1543762 made by reacting 142 parts of stearic acid with 43 parts of Polymin P under the conditions employed in the preparation of Agent H (see Example 7) the dispersions are non-fluid and therefore difficult to handle.

The following table gives further examples of fluid compositions of the invention which are obtained by milling together the pigment and the number of parts thereof listed in column 2 of the table, the agents and the number of parts thereof listed in column 3 of the table and sufficient of the organic liquids listed in column 4 of the table to bring the total weight to 10 parts.

| Ex. | Pigment and amount thereof | Agent and amount thereof | Organic liquid |
|---|---|---|---|
| 14 | 3 parts of dibromo-anthanthrone | 0.9 part of Agent B | xylene |
| 15 | 3 parts of quinacridone | " | " |
| 16 | 3 parts of carbon black | " | " |
| 17 | 4 parts of C.I. Pigment Yellow No.12 (21090) | " | Petroleum fraction boiling at 100°–120° C. |
| 18 | 4 parts of C.I. Pigment Red No.57 (15850 lake) | 0.8 part of Agent B | Petroleum fraction boiling at 100°–120° C. |
| 19 | 5 parts of carbon black | 0.75 part of Agent B | Petroleum fraction boiling at 100°–120° C. |
| 20 | 3 parts of C.I. Pigment Violet No. 23 | 0.9 part of Agent C | petroleum fraction boiling at 100°–120° C. |
| 21 | 3 parts of polychloro copper phthalocyanine | " | toluene |
| 22 | 3 parts of β-form copper phthalocyanine | 1.45 parts of the 41.5% Agent D solution and 0.3 part of the Fluidising Agent described below | " |
| 23 | 4 parts of carbon black | 1.78 parts of the 33.7% solution of Agent E | toluene |
| 24 | " | 1.79 parts of the 33.6% solution of Agent F | " |
| 25 | " | 1.82 parts of the 32.9% solution of Agent G | " |
| 26 | 3 parts of the phospho-molybdotungstate of | 1.62 parts of the 55.6% solution of | petroleum fraction |

-continued

| Ex. | Pigment and amount thereof | Agent and amount thereof | Organic liquid |
|---|---|---|---|
| | C.I. Basic Blue 7 (42595) | Agent H | boiling at 100°–120° C. |
| 27 | 3 parts of C.I. Pigment Yellow No.34 (77603) | 1.62 pats of the 55.6% solution of Agent H | petroleum fraction boiling at 100°–120° C. |
| 28 | 3 parts of C.I. Pigment Violet No.5 (58055 lake) | 1.62 parts of the 55.6% solution of Agent H | petroleum fraction boiling at 100°–120° C. |
| 29 | 3 parts of C.I. Pigment Green No.7 (74260) | 1.62 parts of the 55.6% solution of Agent H | petroleum fraction boiling at 100°–120° C. |
| 30 | 3 parts of C.I. Vat Orange No.3 (59300) | 1.62 parts of the 55.6% solution of Agent H | petroleum fraction boiling at 100°–120° C. |
| 31 | 3 parts of C.I. Vat Blue No.4 (69800) | 1.62 parts of the 55.6% solution of Agent H | petroleum fraction boiling at 100°–120° C. |
| 32 | 3 parts of carbon black | 1.62 parts of the 55.6% solution of Agent H | petroleum fraction boiling at 100°–120° C. |
| 33 | 3 parts of C.I. Pigment Yellow No.12 (21090) | 1.62 parts of the 55.6% solution of Agent H | petroleum fraction boiling atk 100°–120° C. |
| 34 | 3 parts of C.I. Vat Blue No.4 (69800) | 1.62 parts of the 55.6% solution of Agent H | hexane |
| 35 | 3 parts of C.I. Vat Blue No.4 (69800) | 1.62 parts of the 55.6% solution of Agent H | cyclohexane |
| 36 | 3 parts of C.I. Vat Blue No.4 (69800) | 1.62 parts of the 55.6% solution of Agent H | methyliso-butylketone |
| 37 | 3 parts of C.I. Pigment Green No.7 (74260) | 0.9 part of Agent I | petroleum fraction boiling at 100°–120° C. |
| 38 | 2 parts of C.I. Vat Blue No.4 (69800) | 1.08 parts of the 55.6% solution of Agent H | butyl acetate |

EXAMPLE 39

A newsprint ink made from 12 parts of carbon black and 88 parts of spindle oil is compared for viscosity at various rates of shear using a Ferranti-Shirley cone-and-plate viscometer at 25° C. with a newsprint ink made from 12 parts of carbon black, 4 parts of the 50% solution of Agent J described in Example 9 and 84 parts of spindle oil, and with a newsprint ink made from 12 parts of carbon black, 6.7 parts of the 30% solution of Agent K described in Example 10 and 81.3 parts of spindle oil. The inks containing Agent J or Agent K are more fluid and more Newtonian as shown in the following table:

| Rate of shear ($sec^{-1}$) | Viscosity (poise) | | |
|---|---|---|---|
| | Ink without agent | Ink with Agent J | Ink with Agent K |
| 70.95 | 9.5 | 3.61 | 3.24 |
| 283.8 | 5.2 | 3.57 | 3.15 |
| 567.6 | 4.4 | 3.36 | 3.06 |
| 709.5 | 4.1 | 3.23 | 3.04 |

We claim:

1. A dispersing agent comprising the reaction product of a poly(lower alkylene)imine with a polyester having a free carboxylic acid group, in which there are at least two polyester chains attached to each poly(lower alkylene)imine chain, the number average molecular weight of the polyester being in the range of 5600 to 560 and the molecular weight of the poly(lower alkylene)imine being such that it has a viscosity measured at 25° C. as a 25% solution in water in the range of 9.3 to 2780 centipoises.

2. A dispersing agent according to claim 1 wherein the reaction product is predominantly an amide.

3. A dispersing agent according to claim 1 wherein the reaction product is predominantly a salt.

4. A dispersing agent according to claim 1 wherein the polyester is derived from a hydroxy carboxylic acid of the formula HO—X—COOH wherein X is a divalent saturated or unsaturated aliphatic radical containing at least 8 carbon atoms and in which there are at least 4 carbon atoms between the hydroxy and carboxylic acid groups, or from a mixture of such a hydroxycarboxylic acid and a carboxylic acid which is free from hydroxy groups.

5. A dispersing agent according to claim 4 wherein the polyester has a number average molecular weight of 1600 and is derived from commercial 12-hydroxy stearic acid.

6. A dispersing agent according to claim 1 wherein the poly(lower alkylene)imine is a highly branched form in which at least 20% of the nitrogen atoms are present as tertiary amino groups.

7. A dispersing agent according to claim 6 wherein the poly(lower alkylene)imine is a poly(ethylene)imine having an average molecular weight in the range 5000 to 100,000.

8. A dispersing agent according to claim 7 wherein the weight ratio of the polyester to the poly(ethylene)imine is in the range 2:1 to 5:1.

9. A dispersion of a finely divided solid in an organic liquid containing from 5 to 50% by weight of a dispersing agent according to claim 1.

10. A dispersion according to claim 9 containing from 15% to 40% by weight for the dispersing agent based on the weight of the solid.

11. A dispersion according to claim 9 containing from 20% to 50% by weight of the solid based on the total weight of the dispersion.

12. A dispersion according to claim 9 wherein the solid is a dyestuff or a pigment.

13. A dispersion according to claim 12 wherein the pigment is selected from the group comprising rubine toners, benzidine yellows and carbon blacks.

14. A dispersion according to claim 12 wherein the dyestuff is a disperse dyestuff.

15. A dispersion according to claim 9 wherein the organic liquid is a hydrocarbon.

16. A dispersing agent according to claim 1 wherein the viscosity of the poly(lower alkylene)imine is in the range of from 2580 to 2780 centipoises.

* * * * *